Figure 1:
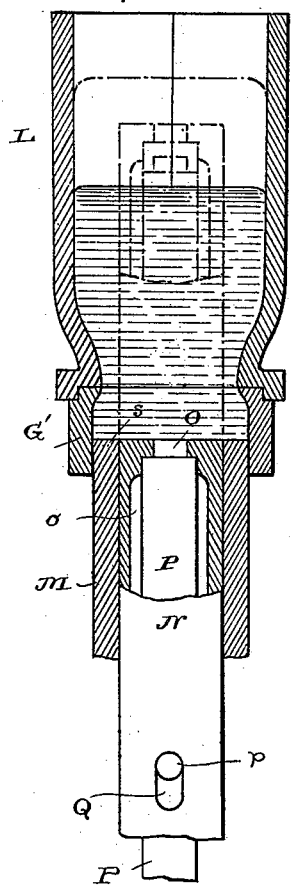

(No Model.) 3 Sheets—Sheet 1.

H. M. ASHLEY.
MACHINERY FOR MAKING GLASS BOTTLES, &c.

No. 403,025. Patented May 7, 1889.

Witnesses.

Inventor.
HOWARD MATRAVERS ASHLEY.
By his Attorney Francis Forbes

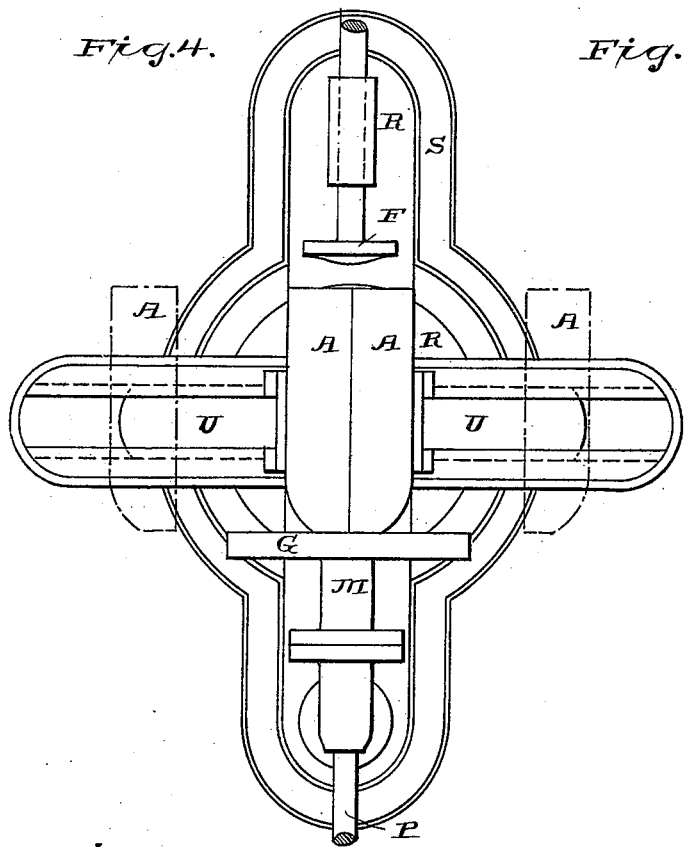
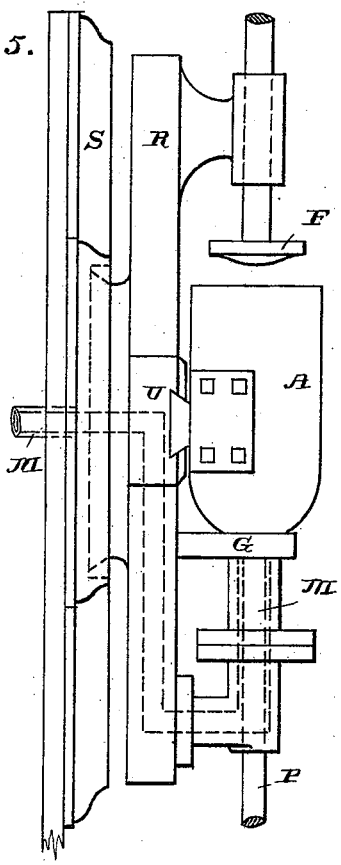
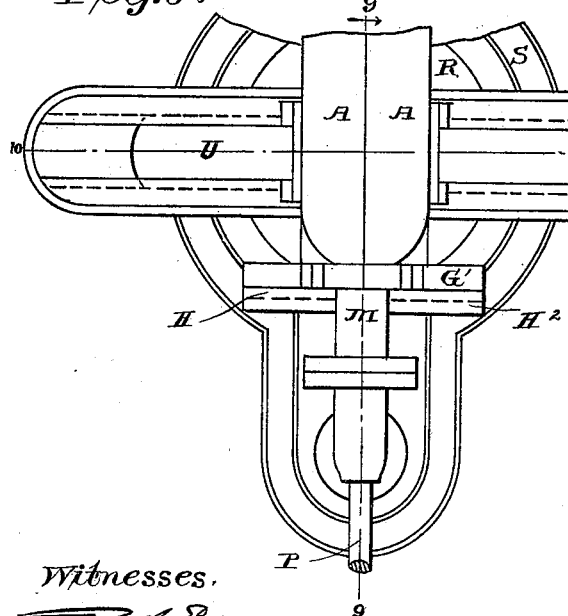
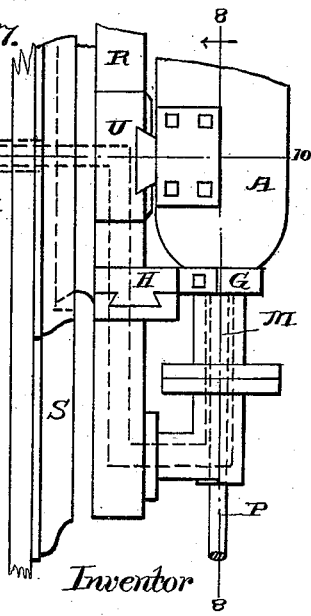

(No Model.) 3 Sheets—Sheet 3.
H. M. ASHLEY.
MACHINERY FOR MAKING GLASS BOTTLES, &c.
No. 403,025. Patented May 7, 1889.
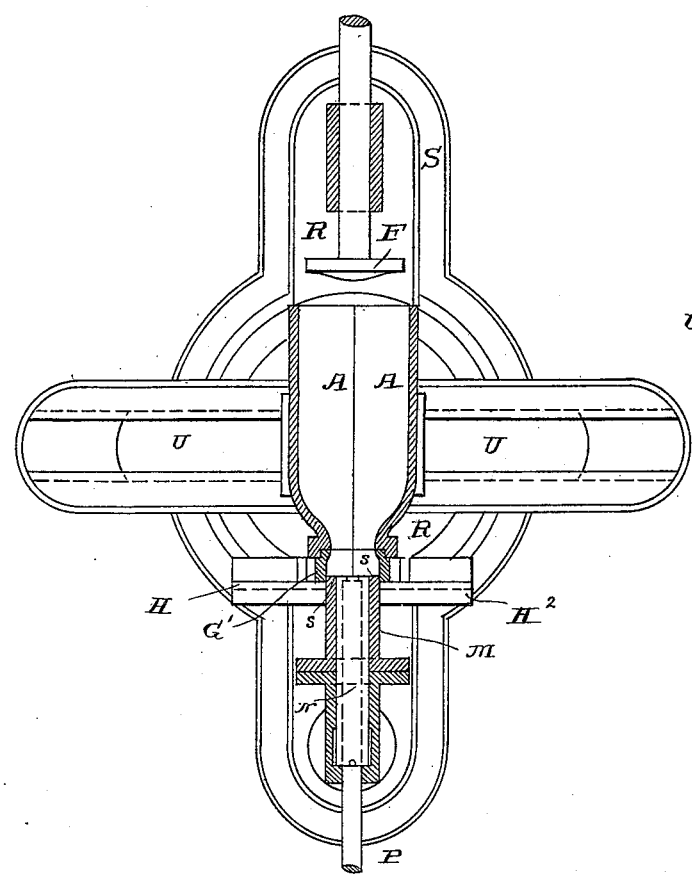
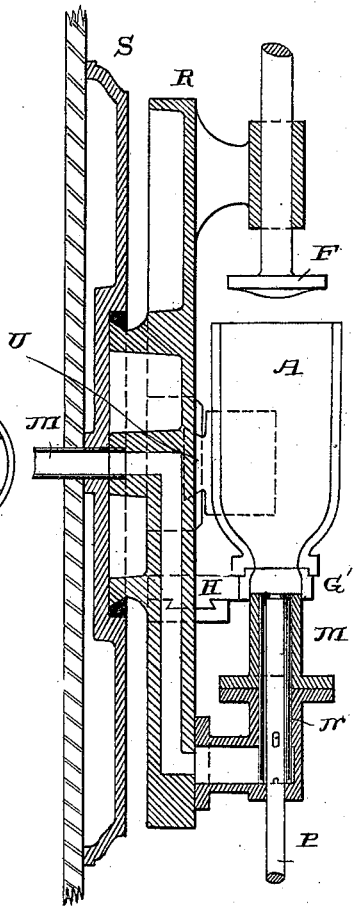
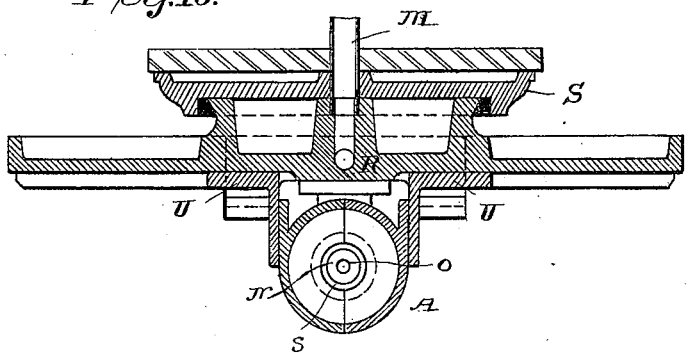
Witnesses.
Inventor
HOWARD MATRAVERS ASHLEY
By his Attorney Francis Forbes

UNITED STATES PATENT OFFICE.

HOWARD MATRAVERS ASHLEY, OF FERRYBRIDGE, COUNTY OF YORK, ENGLAND.

MACHINERY FOR MAKING GLASS BOTTLES, &c.

SPECIFICATION forming part of Letters Patent No. 403,025, dated May 7, 1889.

Original application filed September 26, 1887, Serial No. 250,767. Divided and this application filed November 10, 1888. Serial No. 290,508. (No model.) Patented in England November 13, 1886, No. 14,727, and March 7, 1887, No. 3,434; in Austria-Hungary September 19, 1887; in Belgium September 23, 1887; in France September 24, 1887; in Canada January 3, 1888, No. 28,296; in Italy February 17, 1888; in Norway March 2, 1888; in Victoria April 18, 1888; in New South Wales April 20, 1888; in Tasmania April 21, 1888; in Spain July 13, 1888, and in Portugal August 3, 1888.

*To all whom it may concern:*

Be it known that I, HOWARD MATRAVERS ASHLEY, a subject of the Queen of Great Britain and Ireland, and a resident of Ferrybridge, in the county of York, England, have invented a new and useful Improvement in Machinery for the Manufacture of Bottles and other Like Hollow Glassware, (patented to me in Great Britain and Ireland by Letters Patent No. 14,727, dated November 13, 1886, and No. 3,434, dated March 7, 1887; in Austria-Hungary by Letters Patent dated September 19, 1887; in Belgium by Letters Patent dated September 23, 1887; in France by Letters Patent dated September 24, 1887; in Canada by Letters Patent No. 28,296, dated January 3, 1888; in Italy by Letters Patent dated February 17, 1888; in Victoria by Letters Patent dated April 18, 1888; in New South Wales by Letters Patent dated April 20, 1888; in Tasmania by Letters Patent dated April 21, 1888; in Norway by Letters Patent dated March 2, 1888; in Spain by Letters Patent dated July 13, 1888, and in Portugal by Letters Patent dated August 3, 1888,) of which the following is a specification.

This invention relates to means for making bottles and like hollow glassware by machinery, so as to dispense with the harmful process of glass-blowing by mouth, and also to reduce the cost of manufacture.

In another specification forming part of an application for United States Letters Patent, filed September 26, 1887, Serial No. 250,767, of which this is a division, and in another division thereof, Serial No. 290,506, filed November 10, 1888, I have described and claimed certain processes for effecting the above-named object.

The present invention consists in peculiar apparatus primarily designed for carrying said processes into effect and comprising certain novel combinations of parts hereinafter set forth and claimed.

Three sheets of drawings accompany this specification as part thereof.

Figure 2:
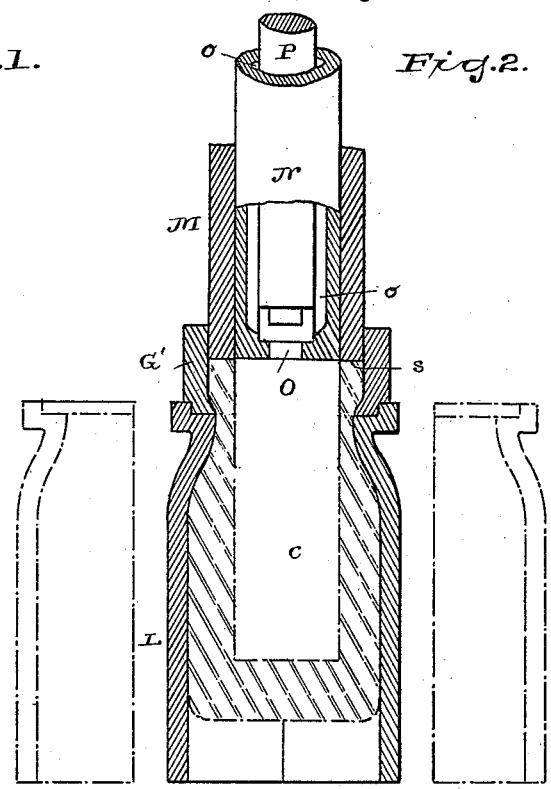
Figure 3:
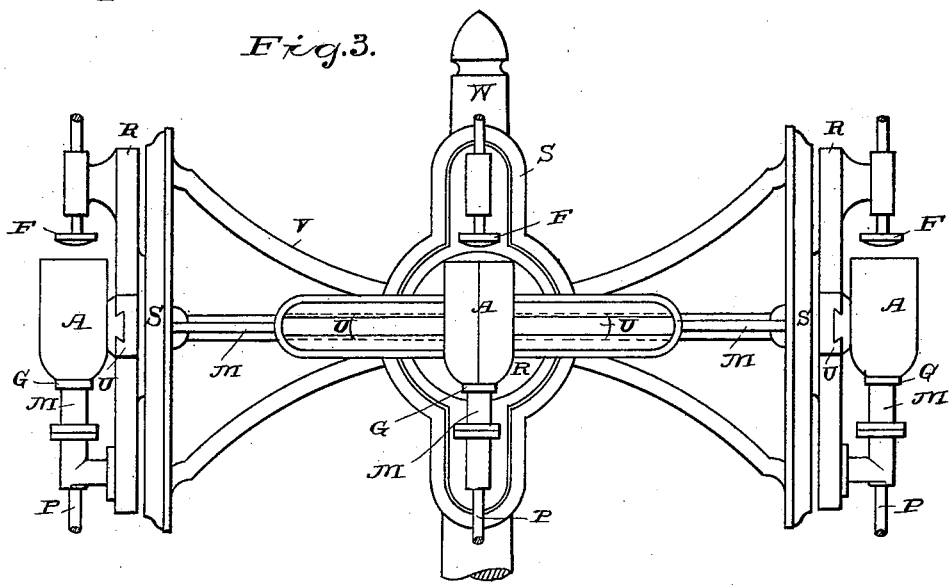

Figures 1 and 2 of the drawings represent sectional elevations of a "parison-mold," illustrating by full and dotted lines four positions of its parts. Fig. 3 is a small-scale elevation of the upper part of a bottle-molding apparatus having four machines for use in succession. Figs. 4 and 5 are face and side views of one of said machines on a larger scale. Figs. 6 and 7 are like views illustrating a preferred modification, and Figs. 8, 9, and 10 represent sections on the dotted lines correspondingly numbered in Figs. 6 and 7.

Like letters of reference indicate corresponding parts in the several figures.

For clearness I have confined the drawings and will confine the following description to molds for making bottles, and have omitted in the drawings details of frame-work and actuating devices, which form no part of this invention and will be readily supplied by machinists without further direction.

The first part of my aforesaid process, as illustrated by Fig. 1, consists in measuring the molten glass, casting a "parison" in inverted position with a head that is finished as to external shape, and forming an initial recess or cavity therein by punching upward into the parison while it is inverted and the molten glass is unconfined, in contradistinction to forming the head of the bottle by pressing or by spinning operations. According to the present invention this is effected within the bottle-mold itself, and the body of the bottle is subsequently expanded therein by the internal pressure of a suitable gaseous fluid—as air, steam, or gas. The apparatus or machinery represented by Figs. 3 to 10, inclusive, is of this description.

In the said parison-mold, Figs. 1 and 2, the parts of a suitable body-mold, L, coact with a head-mold or collar, G', upon a tube or "blow-pipe," M, through which a hollow punch, N, works. This punch is made with a suitable opening, O, in its "face," which enters the mold, and an internal plug, P, is in the example fitted thereto. The stem of this plug extends longitudinally through the outer end of the punch, and serves as a means by which to force the punch forward into the glass within the mold to form the initial cavity c, and then to retract the punch. This movement is controlled by a stud-pin, p, working in a slot, Q, in the punch N, and passages o in the punch connect the opening O with the interior of the blow-pipe M. When the required quantity of molten glass is run into the inverted mold, thereby casting a parison in inverted position, the punch N is forced upward into the same, its outlet-opening O being kept closed by the plug P, and on being retracted the first movement of the plug admits a gaseous fluid—as air—through the outlet-opening O into the cavity c, from which the punch is being withdrawn, so as to prevent a vacuum in the glass. The plug is shown at the end of its opening movement in dotted lines in Fig. 1. In the act of casting the parison the head of the bottle is finished as to external shape without any pressing or any spinning operation by means of a suitably-recessed head-mold or collar, G or G', and an annular surface, s, which is conveniently formed on the end of the tube M within the inner circumference of the collar. This surface shapes the outer face of the lip, and is readily given any required form by lathe-turning it.

The diameter of the punch N is made suitable for the mouth of the bottle, and the glass cut out by the punch N is carried bodily forward and left in the hotter part of the mass, where it soon recovers from the chilling contact of the punch and head-mold, while the mouth itself is sufficiently chilled to cause it to preserve the diameter so given to it. Bottles thus made are perfectly uniform as to size of mouth and shape of head or lip, which is frequently a great desideratum.

In the said apparatus (represented by Figs. 3 to 10, inclusive) the glass may be punched in precisely the same way and by like means. Thus P, Figs. 3 to 10, represents the plug, and N, Figs. 8 and 9, represents the hollow punch, already described. Each bottle-mold A, with its immediate accessories, including a movable bottom, F, and a part of the frame-work to which it is attached, is adapted to be turned vertically or reversed. The molten glass is poured into each mold and punched in the inverted position in which the molds are shown in the figures. When a mold has been reversed, the parison is suspended by its head, so as to elongate by gravitation until it reaches the proper length and consistency for blowing. Air, for example, under suitable pressure is then admitted through the hollow punch into the initial cavity of the parison, and the latter is thus expanded within and conformed to the interior of the mold as regards the neck, body, and bottom of the bottle.

When the diameter of the neck of a bottle is to exceed the diameter of the head, a collar, G, may be used in one part; but for molding the head otherwise, as indicated in Figs. 1 and 2, a divided collar, such as is shown at G' in said figures, is required. Such collar is also shown at G' in Figs. 6 to 10. The divided collar preferably embraces a suitable nozzle, which is formed, for example, by the end of said tube M, and is provided with said surface s.

The parts of the body-molds L and A and those of the divided collars G' may be carried into and out of position by any approved means, such as the lateral slides shown at U, Figs. 3 to 10, and at H H², Figs. 6 to 9, actuated through suitable connections by foot or hand.

The inverting-frame R of each bottle-molding machine is secured to relatively-stationary frame-work, S, by means of a circular part or hub, T, upon which it can be turned. An air-conduit, M, extends through the center of each hub T and communicates with the interior of the corresponding punch N, as indicated in dotted lines in Fig. 5, and more clearly shown in Figs. 8 to 10, and through such punch the conduit communicates with the interior of the corresponding body-mold, suitable joints being provided to permit the inverting-frame R to turn over and the punch and plug to reciprocate without allowing air to escape except through the punch. The said relatively stationary frame-work S of either of said bottle-molding machines may be fixed to a standard; but in order to expedite the process of manufacture I have made a revolving frame, V, Fig. 3, contrived to carry a number of such bottle-molding machines, so that two or more may be conveniently used in succession by one operator.

The revolving frame V is fitted to and carried by a partly-tubular support, W, which may be either fixed on the ground or suspended from above. The frame is fitted to work upon a turned or machined part of the support, through which a constant communication is maintained between an air-pump and each air-conduit or blow-pipe, M. Thus air can be admitted to each bottle-molding machine at whatever position it may be. The particular machines represented in Fig. 3 are constructed according to Figs. 4 and 5, as above set forth. The modified machine represented by Figs. 6 to 10 is obviously adapted to be supported and worked in like manner. Any suitable gaseous fluid, as steam or gas under pressure, may be used instead of air; and exhaust-machines constructed as set forth in a companion specification may also be supported on such a revolving frame, in which case the central support, W, would communicate with suitable exhausting apparatus. Said arrangement of a number of invertible molding-machines capable of revolving so as to be brought in succession before the operator, and in which parisons and bottles may be made alternately or otherwise, enables the workman to economize his time by reason of the number of bottles that can be in process of manufacture at one and the same time.

In order that the molten glass when required for use may be of equal temperature throughout, I preferably scoop up a sufficient quantity of glass from the tank with a crucible or like vessel of plumbago or other material that is a slow conductor of heat, and which has been previously heated to the temperature of the glass, so as to prevent chilling the same. After the externally-adhering glass has drained back into the tank the vessel is taken from the furnace and the molten glass is poured therefrom into the molds, as required. While the vessel is so draining the glass within it recovers from any disturbance or variation of its temperature and fluidity due to removing it from the tank, and uniformity of thickness in the molded article is thus insured.

At any part of the mold where the glass would be likely to cool too rapidly from any cause I arrange that the flames from one or more gas-burners shall impinge upon such part, so as to retain it at the required temperature.

Details of construction and procedure which have not been specified may be of any approved description.

I do not claim herein the above-mentioned parison-mold, Figs. 1 and 2, nor the process of measuring the molten glass, casting a parison with a head that is finished as to external shape, forming an initial recess or cavity therein by punching upward into the parison while it is inverted and the molten glass is unconfined, and finally expanding the article within a shaping-mold by the direct pressure of a gaseous fluid, as air; nor the process of measuring the glass and forming an initial recess or cavity therein by punching, and causing the same to be expanded within a shaping-mold by atmospheric pressure within said cavity, by exhausting the air from around said mold, nor any step of either of such processes; nor the above-described process of handling the molten glass preparatory to the parison-casting operation. These inventions are claimed in said original application and divisions thereof, serially numbered 290,506, 290,507, and 290,510, and filed November 10, 1888. Neither do I limit my claims, hereinafter stated, to bottle-molds, to which the drawings and description have been confined for greater clearness, as aforesaid, nor to details of construction not essential to the respective combinations of parts.

Having thus described said improvement in machinery as a whole, I claim as my invention and desire to patent under this specification—

1. In machinery for the manufacture of bottles and other like articles of hollow glassware, the combination of a suitable mold, a suitable punch adapted to be thrust endwise into the neck end of the mold, a movable bottom fitted to the other end of the mold, and an inverting-frame common to said mold, punch, and bottom, turning on a horizontal axis, substantially as hereinbefore specified.

2. In machinery for the manufacture of bottles and other like articles of hollow glassware, the combination, with a suitable mold comprising a longitudinally-divided body-mold, of an inverting-frame provided with lateral ways, and lateral slides working in said ways and carrying the parts of said body-mold, substantially as hereinbefore specified.

3. In machinery for the manufacture of bottles and other like articles of hollow glassware, the combination, with a suitable mold comprising a suitable body-mold and a divided head-mold or collar fitted to the neck end of said body-mold, of an inverting-frame provided with lateral ways, and lateral slides working in said ways and carrying the parts of said divided collar, substantially as hereinbefore specified.

4. In machinery for the manufacture of bottles and other like articles of hollow glassware, the combination, with a suitable mold and a hollow punch adapted to be thrust endwise into the neck end of the mold and having an outlet-opening in its face, of an inverting-frame common to both turning on a horizontal axis, and a conduit for a gaseous fluid, as air, entering said frame at said axis, and communicating with the interior of said punch, substantially as hereinbefore specified.

5. In machinery for the manufacture of bottles and other like articles of hollow glassware, an inverting-frame provided with a suitable mold, which receives the molten glass in its inverted position and is reverted preparatory to the blowing operation, an open-ended hollow punch at the neck end of the mold, adapted to be thrust upward into the inverted mold to provide the molten glass with an initial cavity and then withdrawn, a movable bottom fitted to the other end of the mold, and a conduit for a gaseous fluid, as air, under pressure, communicating with the interior of said punch, for the purposes set forth.

6. An invertible glass-mold for bottles or the like, comprising a suitable body-mold, a vertically-divided head-mold or collar fitted to the neck end of the said body-mold, a nozzle within said collar, and a suitable bottom at the other end of the body-mold, in combination with a hollow punch adapted to be thrust upward through said nozzle into said body-mold and having an outlet-opening in its face, and a conduit supplied with a gaseous fluid, as air, under pressure, in communication with the interior of said punch, substantially as hereinbefore specified.

7. In combination with a vertical hollow support supplied with a gaseous fluid, as air, under pressure, and a revolving frame mounted thereon and having conduits connecting therewith, a number of invertible bottle-molding machines, each comprising a suitable body-mold, a vertically-divided neck mold or collar, a nozzle within said collar, a suitable bottom, and a hollow punch, the latter being in communication with one of said conduits and adapted to be thrust upward through said nozzle into said body-mold and having an outlet-opening in its face, substantially as hereinbefore specified, whereby machines are adapted to be used in succession, first, for making hollow parisons, and, secondly, for making bottles therefrom in the same molds by a mechanical blowing operation, for the object stated.

HOWARD MATRAVERS ASHLEY.

Witnesses:
FRANCIS FORBES,
JAS. L. EWIN.